US 7,661,117 B2

(12) United States Patent
Markel (10) Patent No.: US 7,661,117 B2
(45) Date of Patent: Feb. 9, 2010

(54) DISPLAYING FULL SCREEN STREAMING MEDIA ADVERTISING

(75) Inventor: Steven O. Markel, Highlands Ranch, CO (US)

(73) Assignee: Intellocity USA Inc., San Francisco, CA (US)

( * ) Notice: Subject to any disclaimer, the term of this patent is extended or adjusted under 35 U.S.C. 154(b) by 1171 days.

(21) Appl. No.: 09/997,022

(22) Filed: Nov. 27, 2001

(65) Prior Publication Data

US 2002/0063727 A1 May 30, 2002

Related U.S. Application Data

(60) Provisional application No. 60/253,169, filed on Nov. 27, 2000.

(51) Int. Cl.
*H04N 5/445* (2006.01)
*G06F 13/00* (2006.01)
*G06F 3/00* (2006.01)

(52) U.S. Cl. .............................. 725/43; 725/32; 725/42; 709/217; 709/224; 709/225; 715/738

(58) Field of Classification Search .................. 725/32, 725/34, 36, 42, 43; 709/217, 224, 225; 715/738
See application file for complete search history.

(56) References Cited

U.S. PATENT DOCUMENTS

| 5,467,288 A | 11/1995 | Fasciano et al. ......... 364/514 R |
| 5,524,193 A | 6/1996 | Covington et al. .......... 395/154 |
| 5,583,980 A | 12/1996 | Anderson ................... 395/173 |
| 5,600,775 A | 2/1997 | King et al. .................. 395/806 |
| 5,655,144 A | 8/1997 | Milne et al. ................. 395/807 |
| 5,680,639 A | 10/1997 | Milne et al. ................. 395/806 |
| 5,859,637 A | 1/1999 | Tidwell, II .................. 345/336 |
| 5,929,849 A | 7/1999 | Kikinis ....................... 345/327 |
| 5,931,908 A | 8/1999 | Gerba et al. ................. 709/219 |
| 6,006,241 A | 12/1999 | Purnaveja et al. ........... 707/512 |
| 6,035,119 A | 3/2000 | Massena et al. ............. 395/701 |
| 6,060,997 A | 5/2000 | Taubenheim et al. ... 340/825.44 |
| 6,108,696 A | 8/2000 | Mendhekar et al. ......... 709/217 |
| 6,148,332 A | 11/2000 | Brewer et al. ............... 709/218 |
| 6,154,771 A | 11/2000 | Rangan et al. .............. 709/217 |
| 6,173,317 B1 | 1/2001 | Chaddha et al. ............. 709/219 |
| 6,226,642 B1 | 5/2001 | Beranek et al. .............. 707/10 |
| 6,226,646 B1 | 5/2001 | Geurts ........................ 707/100 |
| 6,230,172 B1 | 5/2001 | Purnaveja et al. ........... 707/512 |
| 6,248,946 B1 | 6/2001 | Dwek .......................... 84/609 |
| 6,314,451 B1 | 11/2001 | Landsman et al. .......... 709/203 |

(Continued)

*Primary Examiner*—Hunter B. Lonsberry
(74) *Attorney, Agent, or Firm*—Schwegman, Lundberg & Woessner, P.A.

(57) ABSTRACT

In response to an advertising event signal, rendering of an active media stream is automatically paused. A new window is opened and forced to full screen size. Advertising is presented in the new window. Some window controls may be disabled such that the advertising window may not be easily resized, closed, or obscured by another window. When advertising is complete, the new window is closed. Rendering of the media stream is resumed. Alternatively, advertising is presented in a video presentation window wherein the size of the window may be adjusted and controls disabled during presentation of an advertising message. Advertising may also comprise text, graphics and images that overlay a video image. As such, the video image may be adjusted to a predetermined size and video presentation window controls may be disabled.

21 Claims, 9 Drawing Sheets

U.S. PATENT DOCUMENTS

| | | | |
|---|---|---|---|
| 6,342,908 B1 * | 1/2002 | Bates et al. | 715/798 |
| 6,396,506 B1 * | 5/2002 | Hoshino et al. | 345/650 |
| 6,609,253 B1 * | 8/2003 | Swix et al. | 725/88 |
| 6,698,020 B1 * | 2/2004 | Zigmond et al. | 725/34 |
| 6,912,504 B1 * | 6/2005 | Rashkovskiy | 705/14 |
| 7,017,173 B1 * | 3/2006 | Armstrong et al. | 725/87 |
| 2001/0018858 A1 * | 9/2001 | Dwek | 84/609 |
| 2002/0032608 A1 * | 3/2002 | Kanter | 705/14 |
| 2002/0104096 A1 * | 8/2002 | Cramer et al. | 725/113 |
| 2003/0142127 A1 * | 7/2003 | Markel | 345/738 |
| 2004/0133467 A1 * | 7/2004 | Siler | 705/14 |
| 2005/0080878 A1 * | 4/2005 | Cunningham et al. | 709/219 |

* cited by examiner

DISPLAYING FULL SCREEN STREAMING MEDIA ADVERTISING

CROSS REFERENCE TO RELATED APPLICATIONS

This application claims the benefit of U.S. patent application Ser. No. 60/253,169 entitled "Displaying Full Screen Streaming Media Advertising", filed Nov. 27, 2000 by Steve O. Markel. In addition, U.S. patent application Ser. No. 60/253,169 entitled "Displaying Full Screen Streaming Media Advertising" is specifically incorporated herein by reference for all that it discloses and teaches.

BACKGROUND OF THE INVENTION a. Field of Invention

The present invention pertains generally to digital video on the Internet and more specifically to displaying advertising in conjunction with a streaming media program.

b. Description of the Background

High bandwidth interfaces to the Internet allow support of streaming video and audio. Streaming refers to the rendering of audio and/or video without having the entire file transferred prior to rendering. Internet based streaming video may be distributed in a manner similar to digital cable television, but may use a different transport such as TCP/IP, etc., and may employ MPEG encoding similar to cable television. Content (programs, movies etc.) may be free of charge, may contain advertising, may be subscribed to (such as HBO for example), or may be provided on a one-time basis similar to pay-per-view. Video programs may be viewed on a television using a decoder box or may be viewed on a personal computer employing a media player in a browser window, or other software programs including proprietary display programs. Additionally, the computer may provide signals to a television set.

Video displayed on a computer is often displayed in a window, allowing other programs to be active at the same time. When multiple windows are open at the same time, they may be arranged such that one window overlaps another window, either in part or in entirety. This capability is present in graphical user interfaces (GUIs) such as those from Microsoft Corporation of Redmond Wash. and Apple Computer Corporation of Cupertino Calif.

An advertising message may be presented in conjunction with streaming content (programs and movies, etc) wherein the advertising message may be embedded in the audio/video stream, or the advertising message may be displayed in a separate window. It is desirable that the advertising message be viewed such that a content distributor may provide program content free of charge to the viewer and generate revenue from the advertising.

A limitation of present computer interfaces such as Microsoft Windows and others is that the user may close or minimize a window containing advertising. Minimizing a displayed window results in the window being removed from the display area and a button being displayed in an area of the screen that may be activated to restore display of the window. Further, a user may open another window on top of a window containing advertising, obscuring the advertising message in part or in entirety. For example, a user may elect to view a program such as a streaming movie, but when advertising appears, the user may switch to another application, such as e-mail or a game, for example, and then return to the program when the advertisement is over. Further yet, a user may reduce the size of a window containing an advertising message. The capability of closing, minimizing, obscuring, or reducing the size of advertising windows diminishes the value of advertising and the rates that a content provider may charge advertisers.

Although the Internet provides the capability for distribution of video programs, an opportunity for greater viewer choice and for generating revenue from Internet distributed programs exists. In order for advertising based distribution of programs to be commercially viable, a new method for displaying advertising which preserves the value of advertising is needed.

SUMMARY OF THE INVENTION

The present invention overcomes the disadvantages and limitations of the prior art by providing an unobstructed window in a graphical user interface to display advertising. Window controls may be disabled such that the window may not be easily closed, resized, or obscured by other applications. During the display of a streaming video program, an ad insert event signals that an advertisement is to be presented. In response to the ad insert event, the streaming video program may be paused, an advertising window may be opened and advertising presented in the window, and upon completion of the advertisement, the window may be closed and display of the streaming video program resumed.

The invention therefore may comprise a method for displaying advertising in conjunction with a streaming video program comprising: presenting a streaming video program in a video presentation window, receiving an ad event signal, pausing presentation of the streaming video program in response to the ad event signal, opening a display window, displaying advertising in the display window, closing the display window, and resuming presentation of the streaming video program.

Alternatively, advertising may be presented in the video presentation window employed to display a streaming video program. In response to an ad insert event, the streaming video program is paused, advertising is presented in the video presentation window, and upon completion of the advertisement, display of the streaming video program resumed. Controls for the video presentation window may be disabled during the advertisement.

The invention may further comprise a method for displaying advertising in conjunction with a streaming video program comprising: presenting a streaming video program in a video presentation window, receiving an ad event signal, pausing presentation of the streaming video program in response to the ad event signal, disabling at least one control function of the video presentation window in response to the ad event signal, displaying advertising in the video presentation window in response to the ad event signal, re-enabling the at least one control function of the presentation window, and resuming presentation of the streaming video program.

The methods of the present invention may also be applied to advertising that is displayed as an enhancement to a streaming video program. For example, a streaming video program may contain images of an automobile. An advertisement may comprise the name of a local dealer being displayed on screen when an image of the automobile is contained in the streaming video program. Such as method of advertising may provide a more agreeable method of advertising in that the ebb and flow of the streaming video program may not be as greatly affected as the pausing of the program to show an advertisement. When an enhancement style advertisement is presented, the video presentation window may be adjusted to a predetermined size such that text, images and graphics, rendered as part of the enhancement, are of proper scale and position.

The invention may additionally comprise a method for displaying advertising in conjunction with a streaming video program comprising: presenting a streaming video program in a video presentation window, receiving an ad event signal, continuing presentation of the streaming video program, checking the size of the video presentation window in response to the ad event signal, adjusting the size of the video presentation window to a predetermined size if the window is of another size, overlaying the streaming video program with an advertisement in response to the ad event signal, restoring the size of the video presentation window if the size was adjusted, and continuing presentation of the streaming video program.

The present invention advantageously provides a method for displaying advertising in conjunction with a streaming video program that may provide increased viewer attention, resulting in increased advertising revenue enabling commercial presentation of Internet based entertainment. The present invention supports advertising formats similar to that of commercial television and familiarity of the user with such formats may result in increased attention, especially if the streaming video program is presented on a television or large screen monitor.

BRIEF DESCRIPTION OF THE DRAWINGS

In the figures.

DETAILED DESCRIPTION OF THE PREFERRED EMBODIMENT OF THE INVENTION

Figure 1:
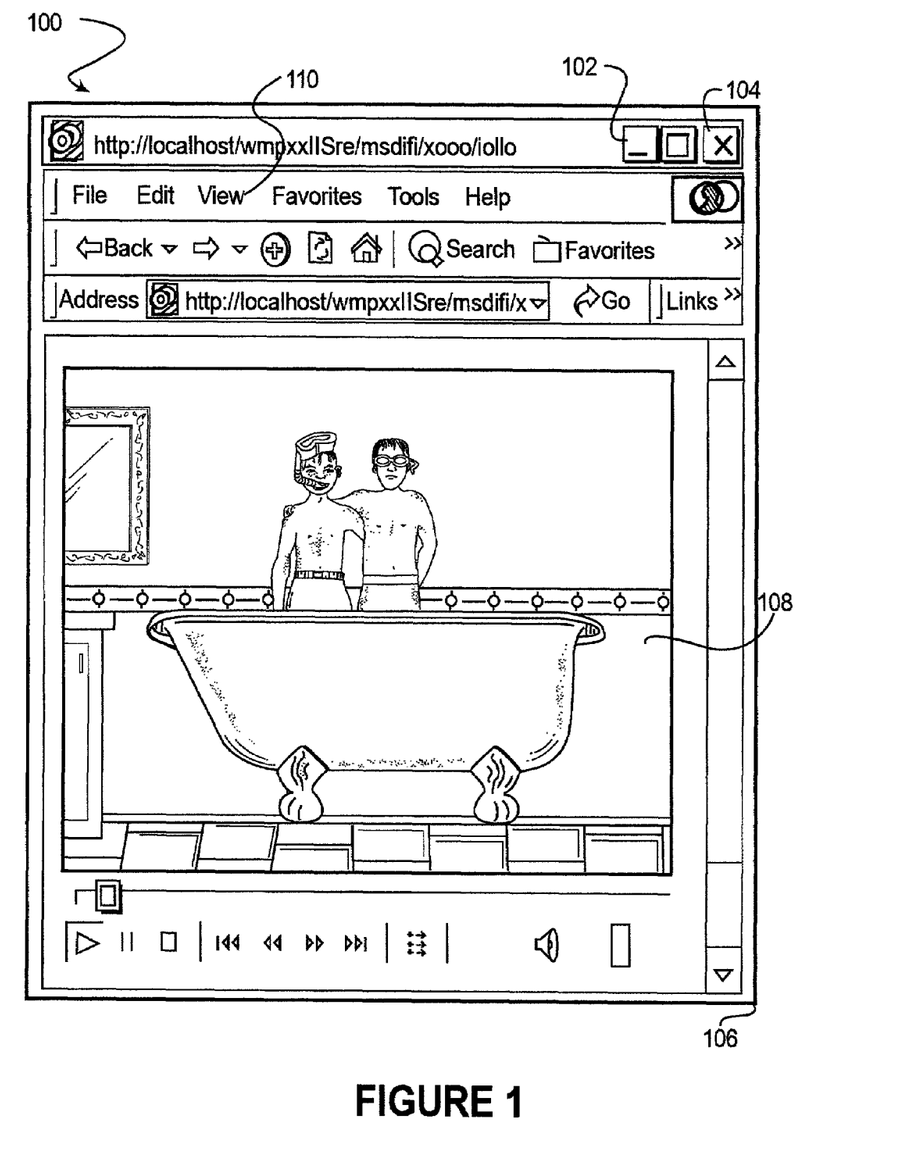
FIG. 1 depicts a video display window and controls.
Figure 2:
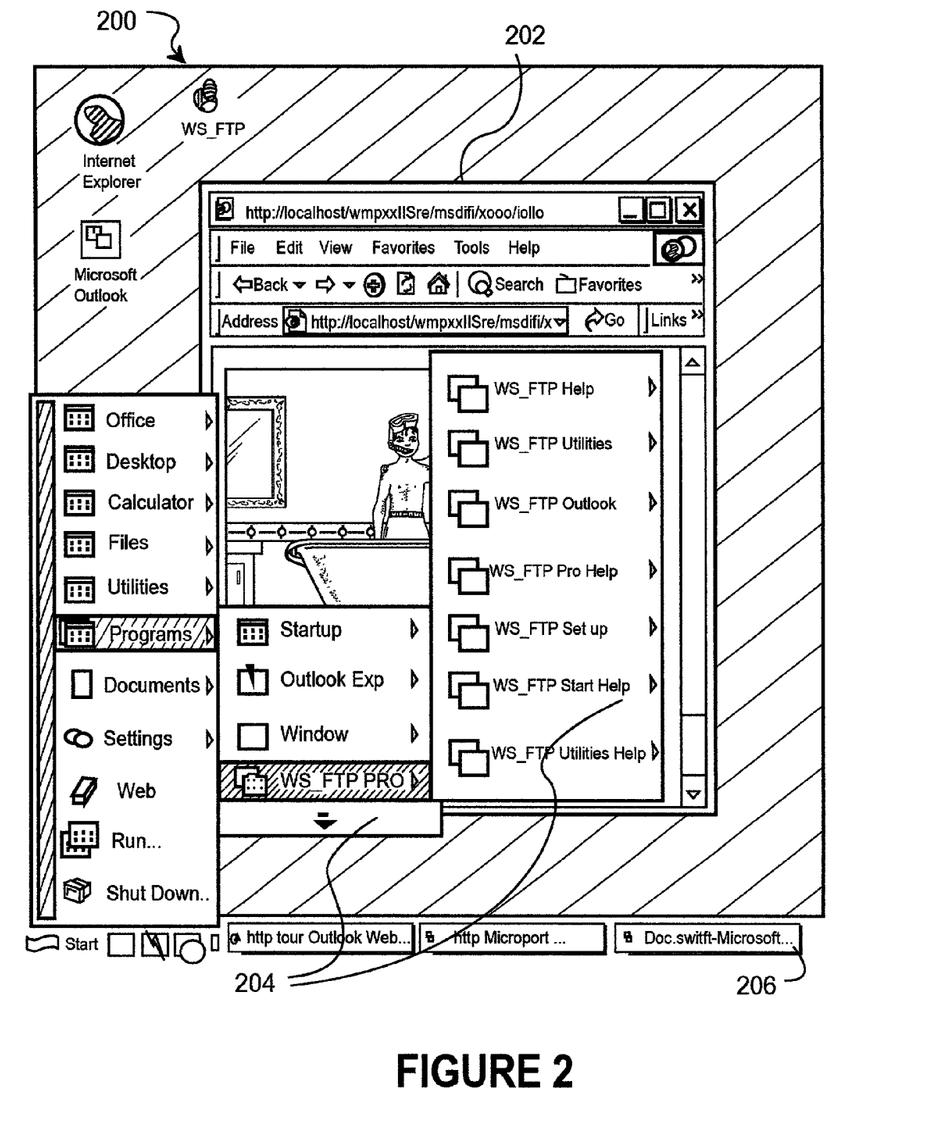
FIG. 2 depicts a video window occupying a portion of a screen display and partial obscuration of the video window.

FIGS. 1 and 2 serve to illustrate the limitations of windowed display systems. FIG. 1 depicts a video display window and controls. Video display window 100 comprises minimize button 102, close button 104, resize corner 106 and video display area 108 in which a streaming video program may be displayed. As a streaming video program is presented, video window 100 may be manipulated using controls comprising the aforementioned minimize button 102, close button 104 and resize corner 106, or may be manipulated using options contained within one or more pull-down menus. View menu 110 may allow a user to select a reduced size for video window 100.

FIG. 2 depicts a video window occupying a portion of a screen display and partial obscuration of the video window. Screen display 200 includes video window 202. Program menus 204 may obscure video window 202 if a user selects a program start menu or equivalent thereof. Further, video window 202 may be obscured by application button 206 that may be employed to restore or maximize an active application.

Figure 3:
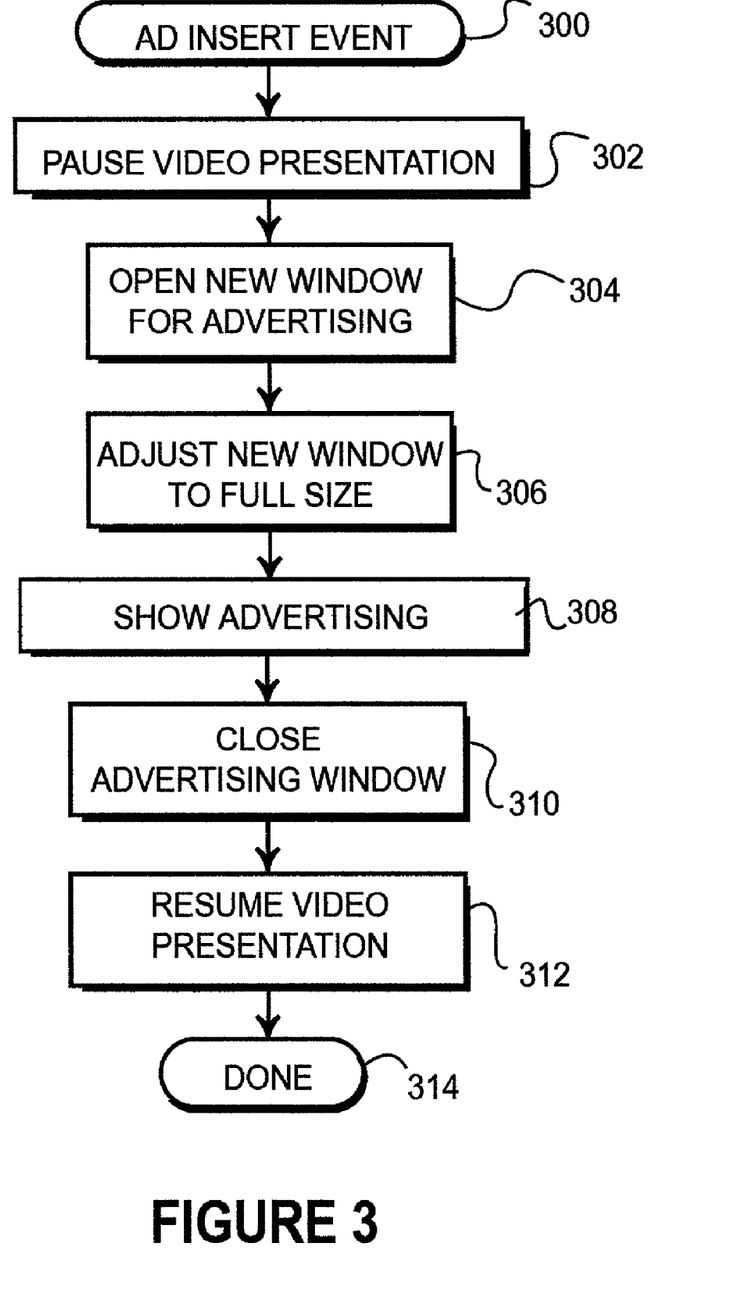
FIG. 3 is a flow chart for presenting advertising in conjunction with a streaming video program.

The present invention overcomes the limitations of prior methods by employing an advertising window that is 'on top' of all other windows and cannot easily be closed, minimized, resized, or obscured. One embodiment of the present invention opens a new window for advertising. When an advertising sequence is executed, a new full screen window is produced that is on top of the video display window and any other windows of the screen display. FIG. 3 is a flow chart for presenting advertising in conjunction with a streaming video program. During a streaming video program, an advertising insert event 300 occurs. The advertising insert event 300 may be indicated by a signal embedded in the video stream, or may be a indicated by a signal transferred across a network, or may be indicated by a signal generated by a program operating in conjunction with a video display program such as Media Player from Microsoft Corporation, or may be indicated by a signal generated by an independent program. In a packetized streaming video format such as MPEG, a non-video packet may supply an ad event indicator. A program operating in conjunction with a video display program may monitor the program for an ad event, or may employ a frame count, elapsed time or other metric to generate an ad event signal. In response to the ad insert event 300, the streaming video program is paused at step 302. The system may continue to buffer video data. After the video is paused, a new display window is opened at step 304. The window opened in step 304 is adjusted to full screen size at step 306. At step 308, advertising is presented in the window. After the advertisement is completed, the advertising window is closed at step 310. The video presentation is then resumed at step 312 and the process is completed at step 314. In some systems, steps 304 and 306 may be combined such that a full screen size window is opened.

Figure 4:
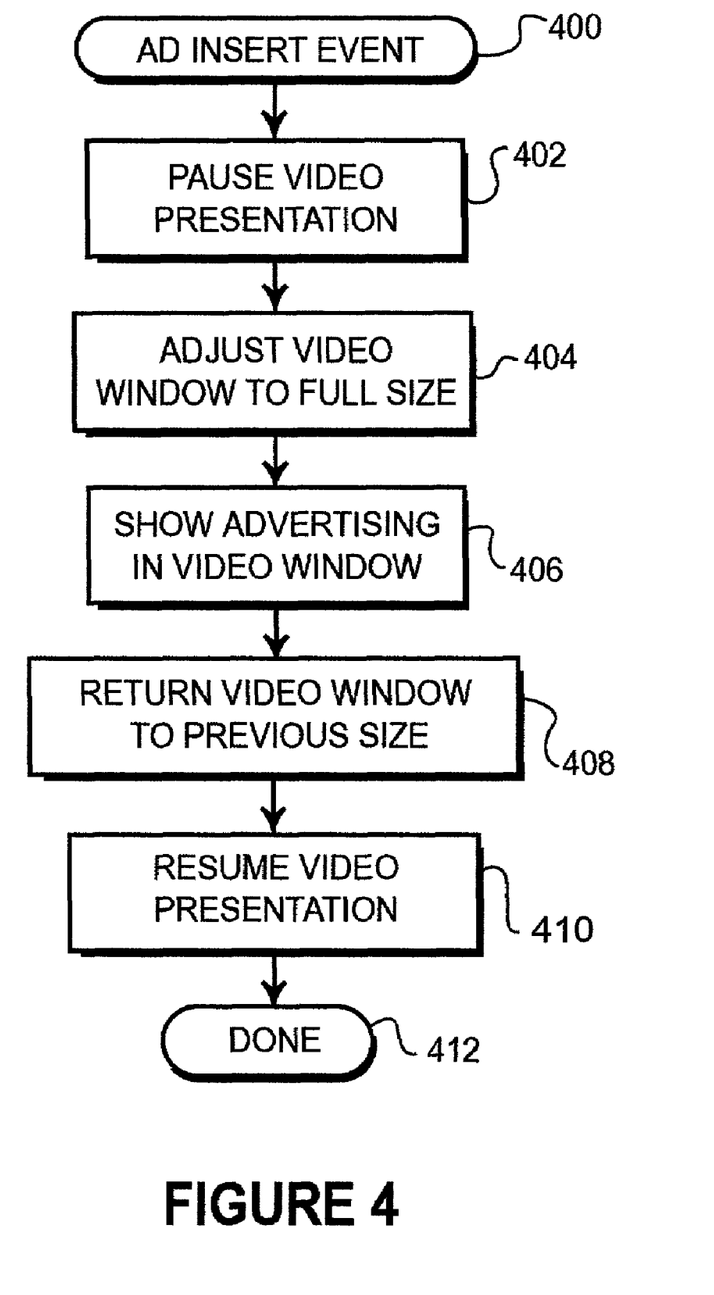
FIG. 4 is a flow chart for presenting advertising in conjunction with a streaming video program wherein advertising is presented within a video window.

In another embodiment of the present invention, advertising is presented in the video window and may be contained within the video stream or may be rendered through add-on programs, such as plug-ins, to a video display program, or may be rendered by an independent program. FIG. 4 is a flow chart for presenting advertising in conjunction with a streaming video program wherein advertising is presented within a video window. In FIG. 4, an advertising insert event occurs at step 400. The video presentation is paused at step 402. The video window is adjusted to full screen size in step 404. Advertising is presented in the full size video window in step 406. When the advertising is completed, the video window is returned to its previous size in step 408. The video presentation is then resumed at step 410 and the process ends at step 412.

In yet another embodiment, the aforementioned steps of adjusting a window to full size may be replaced by steps that provide a window of a predefined minimum size, or that check the size of a video display window used for advertising and increase the size of the window if it is less than a predetermined value.

Figure 5:
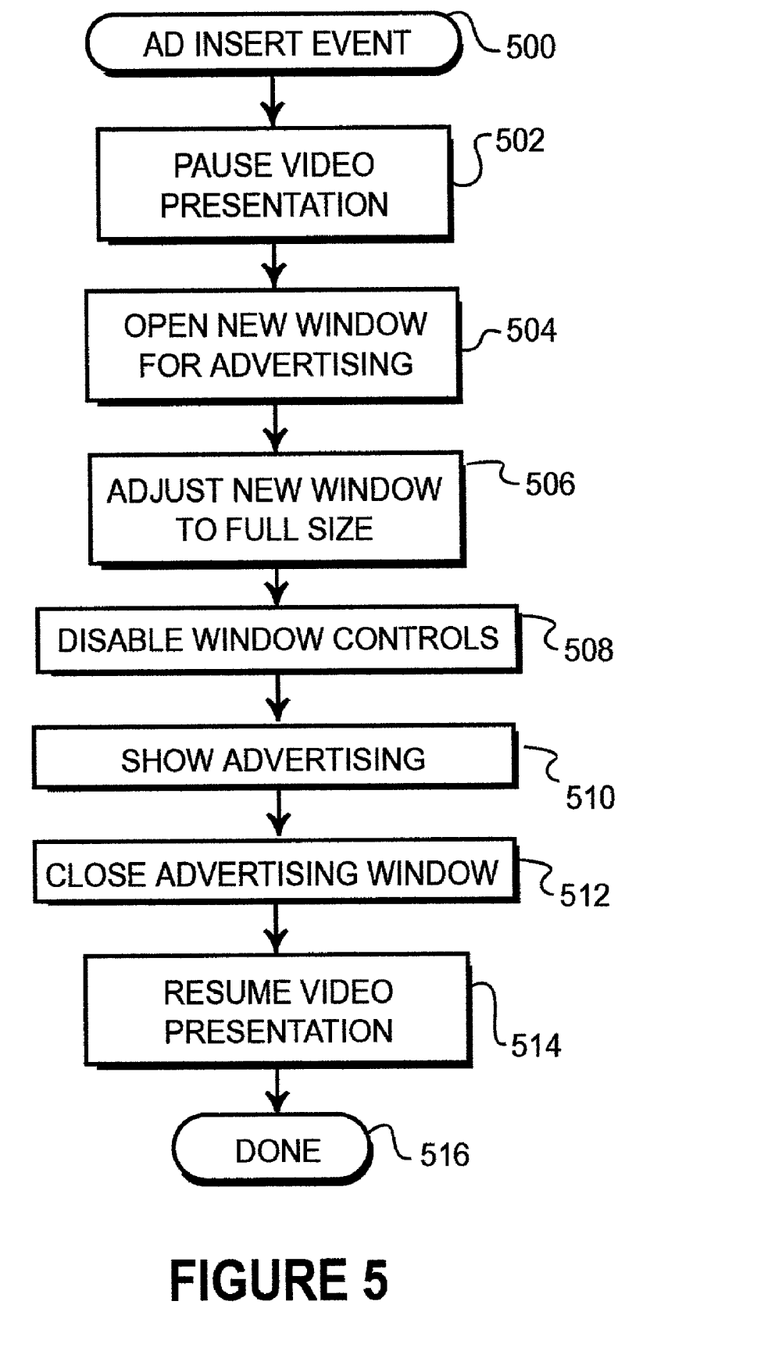
FIG. 5 is a flow chart of a method for presenting advertising in conjunction with a streaming video program wherein window controls are disabled.

The display window employed to present an advertising message may have some or all controls inactivated or disabled. Control buttons, menu options, or mouse indicators may be removed from view, or may be displayed in half-tone to indicate they are in an inactive or disabled state. Further, keystroke combinations or sequences that control window display may be disabled. FIG. 5 is a flow chart of a method for presenting advertising in conjunction with a streaming video program wherein window controls are disabled. During a streaming video program, an advertising insert event 500 occurs. At step 502, the display of the streaming video presentation is paused. The system may continue to buffer video data. After the video is paused, a new display window is opened at step 504. The window is adjusted to full screen size at step 506. Some or all controls for the window are disabled at step 508. At step 510 advertising is shown in the window. After the advertisement is completed, the advertising window is closed at step 512. The video presentation is then resumed at step 514.

Figure 6:
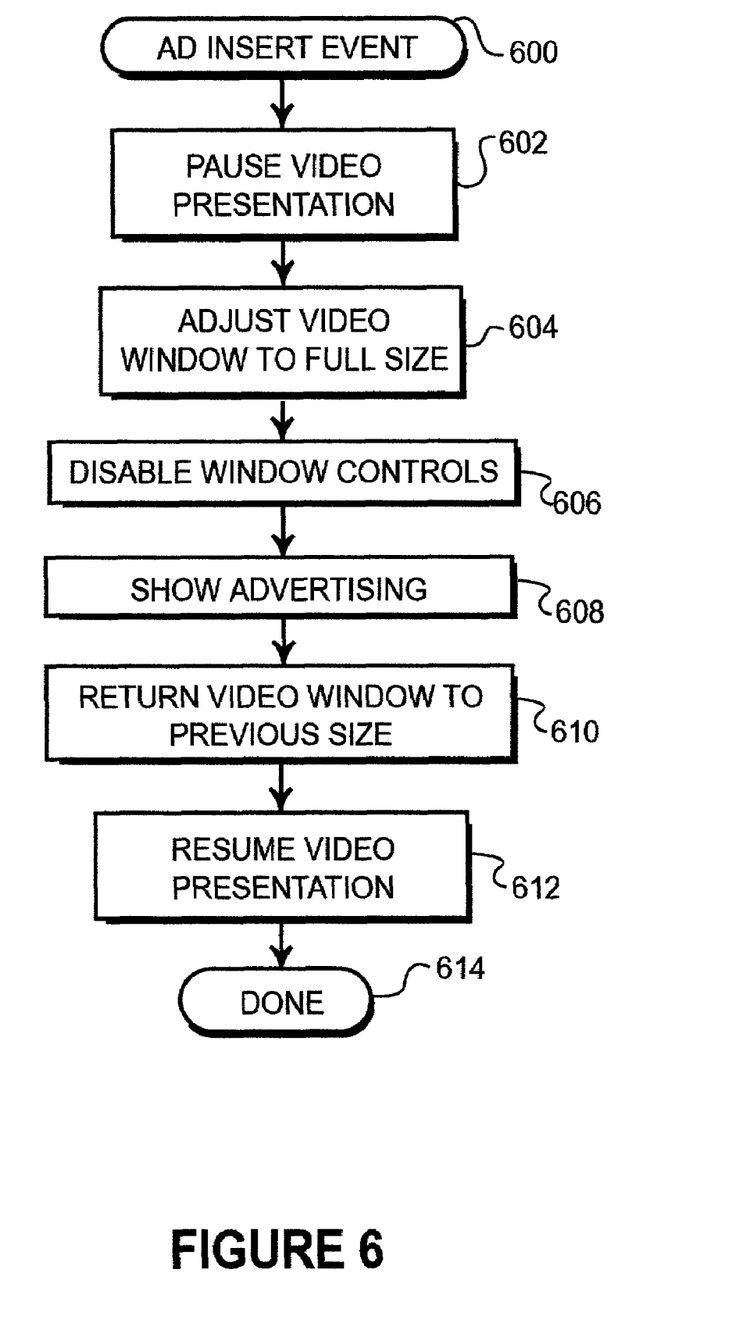
FIG. 6 is a flow chart for presenting advertising in a video window with window controls disabled.

Similarly, when advertising is presented in a video window, the process may include a step to disable window controls. FIG. 6 is a flow chart for presenting advertising in a video window with window controls disabled. During a streaming video program, an advertising insert event 600 occurs. The video presentation is paused at step 602. The video window is made full size in step 604. Controls for the window are disabled at step 606. Advertising is shown in the full size video window in step 608. When the advertising is completed, the video window is returned to its previous size in step 610 and window controls may be re-enabled. The video presentation is then resumed at step 612.

The invention may also include a function such that if the viewer attempts to close, obscure or reduce the size of the advertising window, the viewer may be prompted that closing the advertising window will also terminate the streaming video presentation. The viewer may then be provided with a choice to continue the advertising or terminate the streaming program. Alternatively, if the viewer closes, obscures or reduces the size of the advertising window, the invention may open up a new advertising window and start the advertising anew.

Figure 7:
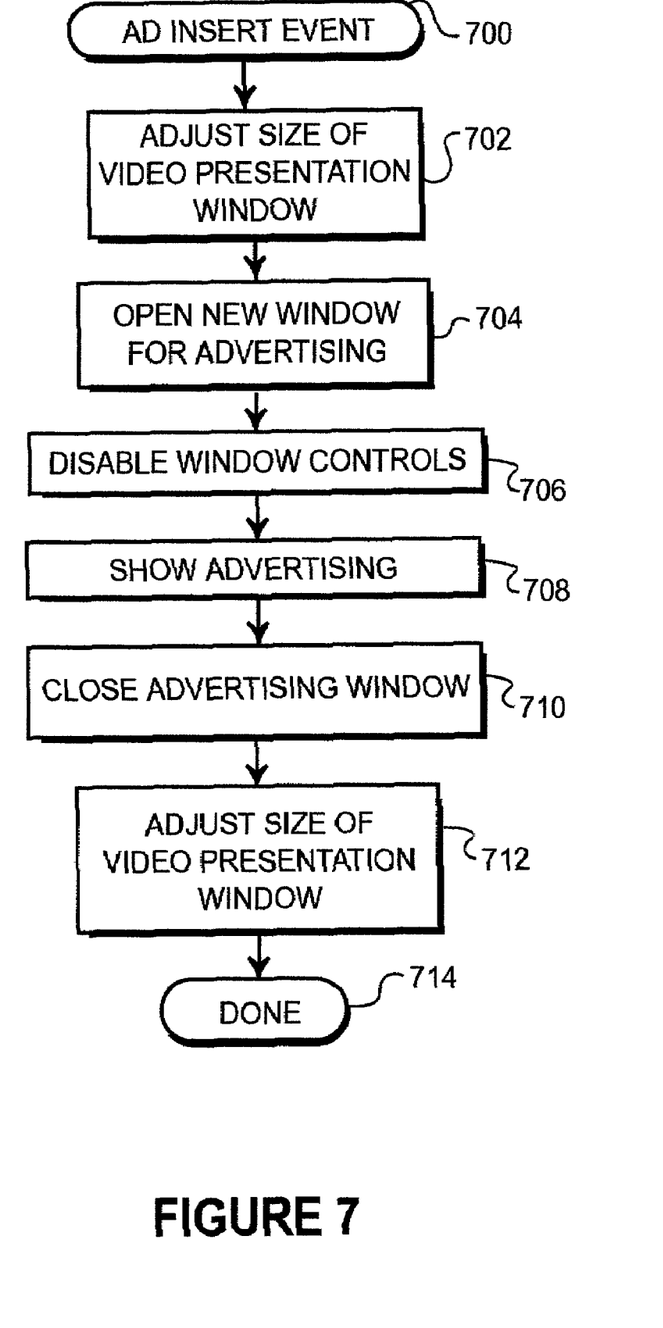
FIG. 7 is a flow chart for displaying advertising in a border window while a streaming video presentation is actively presented in a video presentation window.

An advertising presentation of the present invention may comprise one or more windows such that a border containing advertising may be displayed around an active streaming video presentation. The video presentation window may be adjusted in size to provide a predefined area around the video presentation window in which one or more advertising windows may be opened and advertising presented in conjunction with the streaming video program. FIG. 7 is a flow chart for displaying advertising in a border window while a streaming video presentation is actively presented in a video presentation window. During a streaming video program, an advertising insert event 700 occurs. The size of the video presentation window is adjusted at step 702. A new window for advertising is opened in step 704. One or more window controls for the advertising window are disabled in step 706. Advertising is shown in the advertising window in step 708. When the advertising is completed, the advertising window is closed at step 710. The video presentation window may then be adjusted to a former size in step 712. If the video presentation window was of a size suitable for border advertising prior to the advertising insert event, steps 702 and 712, which adjust the size of the video presentation window, may be omitted.

Figure 8:
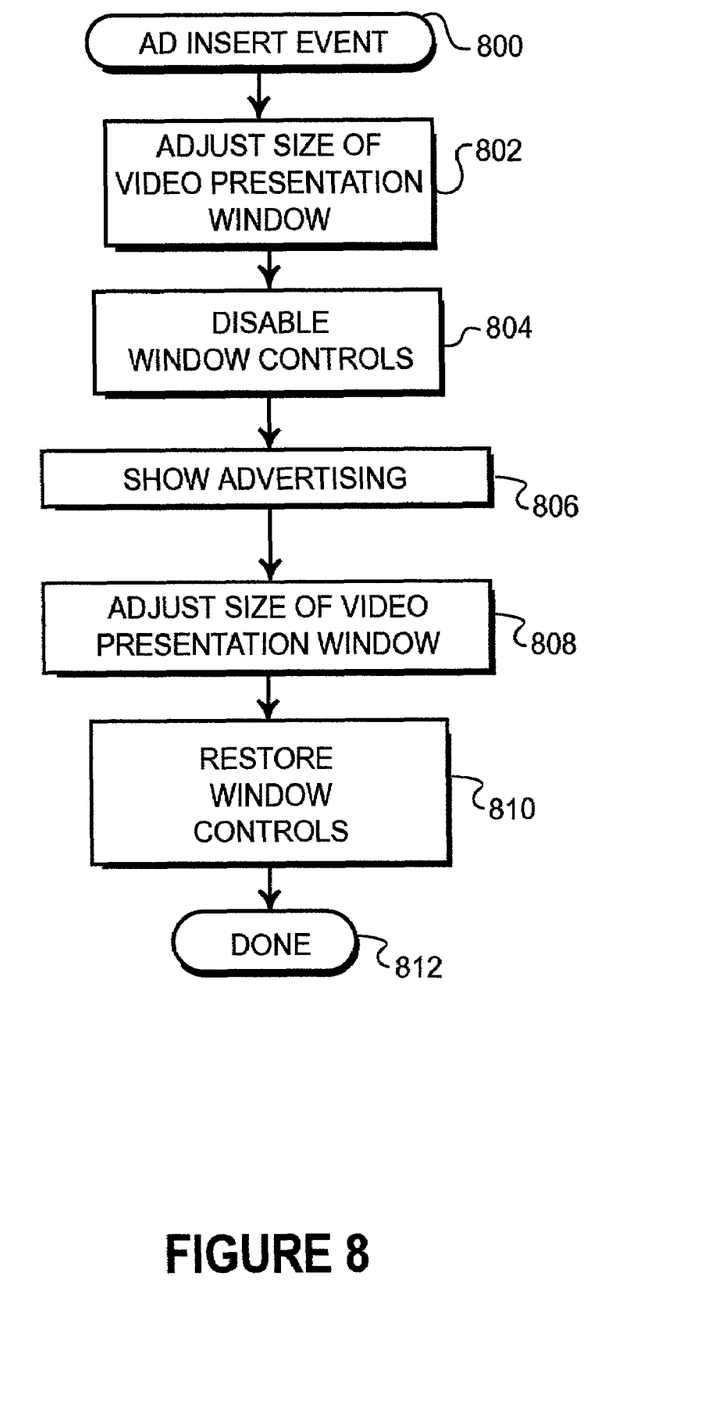
FIG. 8 is a flowchart for presenting advertising that overlays a streaming video image.

The present invention is also applicable to advertising formats where text, graphics, or images, or a combination thereof may overlay the streaming video image. Such formats may display product names or dealer names when products of a predetermined type appear in the video image. The streaming video image may be adjusted to a predetermined size, such that overlaid elements are correctly positioned, and window controls may be disabled. FIG. 8 is a flowchart for presenting advertising that overlays a streaming video image. During a streaming video program, an advertising insert event 800 occurs. The size of the video presentation window may be adjusted in step 802 to a predetermined size. Controls for the video presentation window may be disabled at step 804. At step 806, advertising is shown on top of the streaming video image. When the advertising is complete, step 808 adjusts the size of the video presentation window to its former size. At step 810, controls for the video display window are re-enabled. The method of FIG. 8 is not limited to overlaid images and may be applied to images that are combined logically, arithmetically, or by other methods, with a streaming video program.

Figure 9:
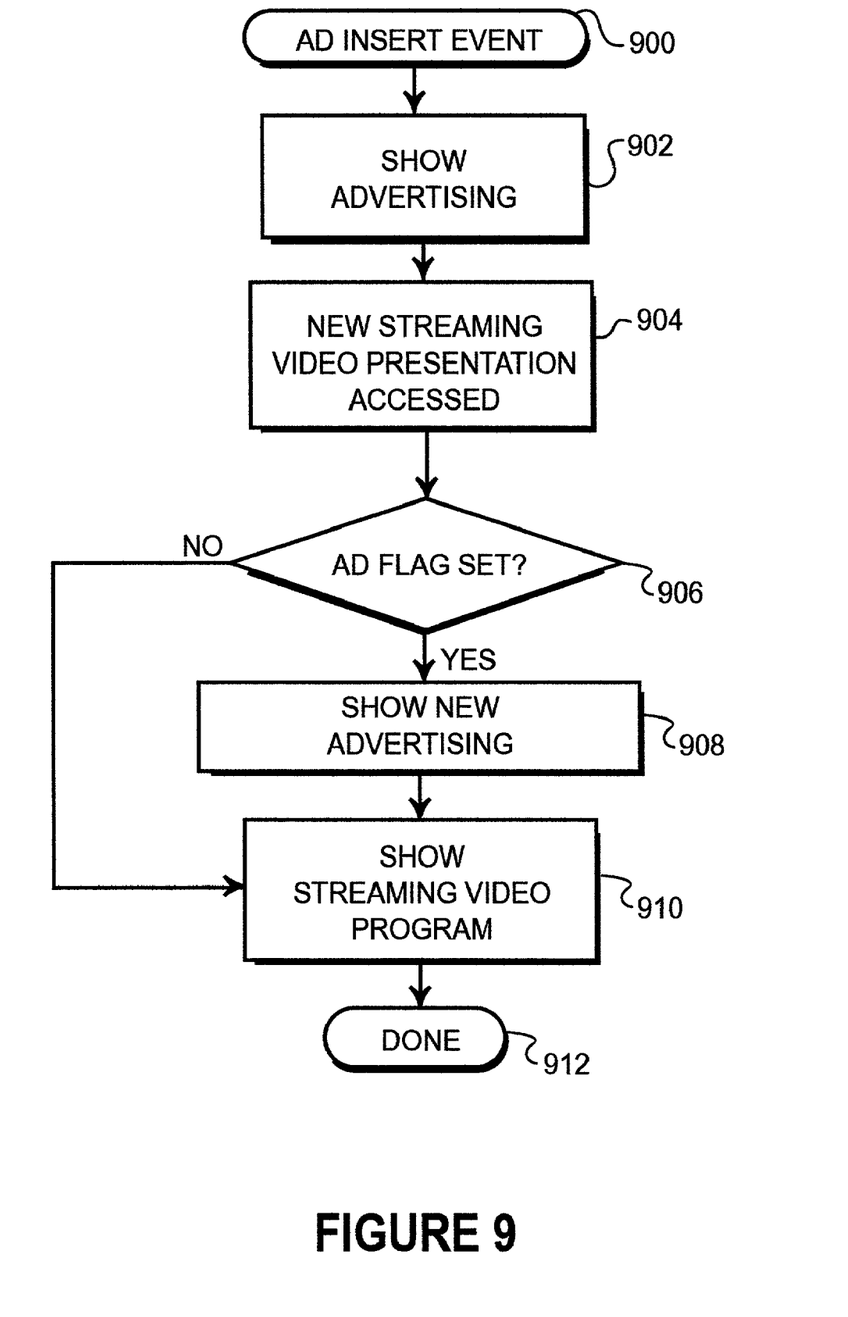
FIG. 9 is a flow chart for advertising display when the streaming video source is altered during an advertisement.

The present invention is well suited to 'channel jumping' on the Internet in a manner similar to broadcast television where a user may access a new website providing another streaming video program. If an advertisement is being presented in conjunction with a currently viewed streaming video program, 'changing the channel' (i.e. streaming video feed) to another 'channel' may result in retention of the advertising window but with new content if the new channel contains advertising, and closing of the advertising window if the new channel does not contain advertising. FIG. 9 is a flow chart for advertising display when the streaming video source is altered during an advertisement. During a streaming video program, an advertising insert event 900 occurs. At step 902, advertising is shown employing a method shown in FIGS. 3 through 8. While the advertising is being shown, another streaming video program is accessed at step 904. At step 906, a check is performed to determine if advertising is being presented in conjunction with the newly accessed streaming video program. If the result of step 906 is that advertising is being shown, the new advertising message is presented in the advertising window employed in step 902. When the advertising message is completed, the new streaming video program is shown at step 910. If the result of step 906 is that advertising is not being shown, the new streaming video program is shown at step 910. The method of FIG. 9 provides content and advertising in a manner similar to broadcast television.

The presentation of advertising and streaming video programs may include conditions. If a user attempts to close a window containing advertising, the user may be informed that such an action will terminate the streaming video program and the user may then be prompted to elect to continue to view the advertising or terminate the program. The features of the present invention may be resident in a movie player application, a stand-alone application, driver, applet, or may be part of a sequence of data and commands sent across the Internet. Additionally, the features of the present invention may be invoked through a dialog box at the beginning of a free-of-charge streaming video program where the viewer agrees to view advertising in order to view the streaming video program free of charge. The advertising window may be implemented using ActiveX, a set of programming rules allowing applications such as spreadsheets and word processors to be viewed in web browser formats.

The present invention therefore advantageously provides a way to present advertising messages in conjunction with a streaming video program that is familiar to television viewers and offers increased viewer attention to commercial messages. This may allow content providers to offer streaming video presentations free of charge over the Internet or other networks, offering a new advertising market and increasing the range of material that may be offered to viewers.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for displaying advertising in conjunction with a streaming video program comprising:
    presenting a streaming video program in a video presentation window;
    receiving an ad event signal that indicates that an ad is to be displayed;
    pausing presentation of said streaming video program in response to said ad event signal;
    opening a display window in response to said ad event signal;
    disabling at least one previously-enabled size control function of said display window;
    adjusting said display window to a predetermined size in response to said ad event signal;
    displaying one or more advertisements in said display window;
    closing said display window in response to said one or more advertisements completing; and
    resuming presentation of said streaming video program.

2. The method of claim 1 wherein said adjusting step comprises:
    adjusting said display window to full-screen size in response to said ad event signal.

3. The method of claim 1 wherein said ad event signal is embedded in said streaming video program.

4. The method of claim 1 wherein said ad event signal is generated by a software program operating at the receiver of said streaming video program.

5. A method for displaying advertising in conjunction with a streaming video program comprising:
    presenting a streaming video program in a video presentation window;
    receiving an ad event signal that indicates that an ad is to be displayed;
    pausing presentation of said streaming video program in response to said ad event signal;
    disabling at least one previously-enabled size control function of said video presentation window in response to said ad event signal;
    adjusting said video presentation window to a predetermined size in response to said ad event signal;
    displaying one or more advertisements in said video presentation window in response to said ad event signal;
    re-enabling said at least one size control function of said video presentation window in response to said one or more advertisements completing; and
    resuming presentation of said streaming video program.

6. The method of claim 5 wherein said adjusting comprises:
    adjusting said video presentation window to full-screen size.

7. The method of claim 5 wherein said ad event signal is embedded in said streaming video program.

8. The method of claim 5 wherein said ad event signal is generated by a software program operating at the receiver of said streaming video program.

9. A method for displaying advertising in conjunction with a streaming video program comprising:
    presenting a streaming video program in a video presentation window;
    receiving an ad event signal;
    continuing presentation of said streaming video program;
    checking the size of said video presentation window in response to said ad event signal;
    adjusting the size of said video presentation window to a predetermined size if said video presentation window is of another size;
    overlaying said streaming video program with an advertisement in response to said ad event signal and disabling at least one previously-enabled size control function of said video presentation window;
    restoring the size of said video presentation window if the size was adjusted; and
    continuing presentation of said streaming video program.

10. The method of claim 9 wherein said ad event signal is embedded in said streaming video program.

11. The method of claim 9 wherein-said ad event signal is generated by a software program operating at the receiver of said streaming video program.

12. The method of claim 9 further comprising re-enabling said at least one size control function of said video presentation window.

13. A method for displaying advertising in conjunction with a streaming video program comprising:
    presenting a streaming video program in a video presentation window;
    receiving an ad event signal that indicates that an ad is to be displayed;
    pausing presentation of said streaming video program in response to said ad event signal;
    selecting a display window other than said video presentation window in response to said ad event signal;
    saving the contents of said display window;
    disabling at least one previously-enabled size control function of said display window;
    adjusting the size of said display window to a predetermined size in response to said ad event signal;
    displaying advertising in said display window in response to said ad event signal;
    restoring the contents of said display window; and
    resuming presentation of said streaming video program.

14. The method of claim 13 further comprising re-enabling said at least one size control function of said display window.

15. The method of claim 13 wherein said adjusting comprises:
    adjusting said display window to full-screen size.

16. A method for displaying advertising in conjunction with a streaming video program comprising:
    presenting a first streaming video program in a video presentation window;
    receiving an ad event signal that indicates that an ad is to be displayed;
    disabling at least one previously-enabled size control function of a display window in response to said ad event signal;
    adjusting the size of said display window to a predetermined size in response to said ad event signal;
    displaying a first advertisement associated with said first streaming video program in said display window in response to said ad event signal;
    receiving a second streaming video program;

setting an indicator if an advertisement is being presented in conjunction with said second streaming video program;

displaying a second advertisement associated with said second streaming video program in said display window if said indicator is set; and presenting said second streaming video program in said video presentation window.

17. The method of claim 1, further comprising preventing resizing of said display window for a predetermined amount of time.

18. A method for displaying advertising in conjunction with a streaming video program comprising:

presenting a streaming video program in a video presentation window;

receiving an ad insert event signal that indicates that an ad is to be displayed;

pausing presentation of said streaming video program in response to said ad insert event signal;

opening a display window in response to said ad insert event signal;

adjusting said display window to a predetermined size in response to said ad insert event signal, wherein at least one previously-enabled size control function of the display window is disabled;

displaying one or more advertisements in said display window;

closing said display window in response to said one or more advertisements completing; and resuming presentation of said streaming video program.

19. The method of claim 18 wherein said adjusting comprises adjusting said display window to full-screen size.

20. The method of claim 18 wherein said ad insert event signal is embedded in said streaming video program.

21. The method of claim 18 wherein said ad insert event signal is generated by a software program operating at the receiver of said streaming video program.

\* \* \* \* \*

UNITED STATES PATENT AND TRADEMARK OFFICE
CERTIFICATE OF CORRECTION

PATENT NO.        : 7,661,117 B2                                                          Page 1 of 1
APPLICATION NO.   : 09/997022
DATED             : February 9, 2010
INVENTOR(S)       : Steven O. Markel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1493 days.

Signed and Sealed this

Twenty-eighth Day of December, 2010

David J. Kappos
*Director of the United States Patent and Trademark Office*